(12) United States Patent
Campagna et al.

(10) Patent No.: US 7,404,089 B1
(45) Date of Patent: Jul. 22, 2008

(54) METHOD AND SYSTEM FOR PROTECTING AGAINST SIDE CHANNEL ATTACKS WHEN PERFORMING CRYPTOGRAPHIC OPERATIONS

(75) Inventors: Matthew J. Campagna, Ridgefield, CT (US); Amit Sethi, Leesburg, VA (US)

(73) Assignee: Pitney Bowes Inc., Stamford, CT (US)

( * ) Notice: Subject to any disclaimer, the term of this patent is extended or adjusted under 35 U.S.C. 154(b) by 469 days.

(21) Appl. No.: 11/144,969

(22) Filed: Jun. 3, 2005

(51) Int. Cl.
   *H04K 1/00* (2006.01)
(52) U.S. Cl. .................. 713/194; 708/492; 380/30
(58) Field of Classification Search ............. 380/28–31, 380/44–47; 713/194
   See application file for complete search history.

(56) References Cited

U.S. PATENT DOCUMENTS

| 5,299,262 | A | 3/1994 | Brickell et al. ............... 380/28 |
| 6,298,442 | B1 * | 10/2001 | Kocher et al. ............... 713/194 |
| 2005/0152541 | A1 * | 7/2005 | Takenaka et al. ............. 380/28 |

OTHER PUBLICATIONS

Pierre-Alain Fouque et. al.: "Defeating Countermeasures Based on Randomized BSD Representations" Lecture Notes in Computer Science, vol. 3156, Aug. 11, 2004, pp. 312-327, XP019009374.

Chevallier-Mames et. al.: "Low—Cost Solutions for Preventing Simple Side-Channel Analysis: Side-Channel Atomicity" IEEE Transactions on Computers, vol. 53, No. 6, Jun. 2004, pp. 760-768, XP002356344.

Changkyun Kim et. al.: "A Secure and Practical CRT-Based RSA to Resist Side Channel Attacks" LNCS International Conference, Apr. 26, 2004, pp. 150-158, XP019006751.

Chevallier- Mames B: "Self-Randomized Exponentiation Algorithms" Lecture Notes in Computer Science, vol. 2964, Feb. 27, 2004 pp. 236-249, XP002297836.

Itoh K et al: "DPA Countermeasures By Improving the Window Method" Cryptographic Hardware and Embedded Systems. International Workshop, Aug. 13, 2002, pp. 303-317, XP001160529.

* cited by examiner

*Primary Examiner*—Gilberto Barron, Jr.
*Assistant Examiner*—Shahrouz Yousefi
(74) *Attorney, Agent, or Firm*—Brian A. Lemm; Angelo N. Chaclas

(57) ABSTRACT

A method and system for protecting against side channel attacks on cryptographic systems that attempt to recover information from externally detectable signals, such as electromagnetic fields or power input variations. A system operates in accordance with the subject invention to process a message using a cryptographic protocol involving a secret key d. The protocol includes a step for computing the result of iteratively performing a binary operation [op] on a digital quantity G, where a secret key d is taken as an integer value, such as elliptic curve scalar point multiplication or modular exponentiation.

15 Claims, 8 Drawing Sheets

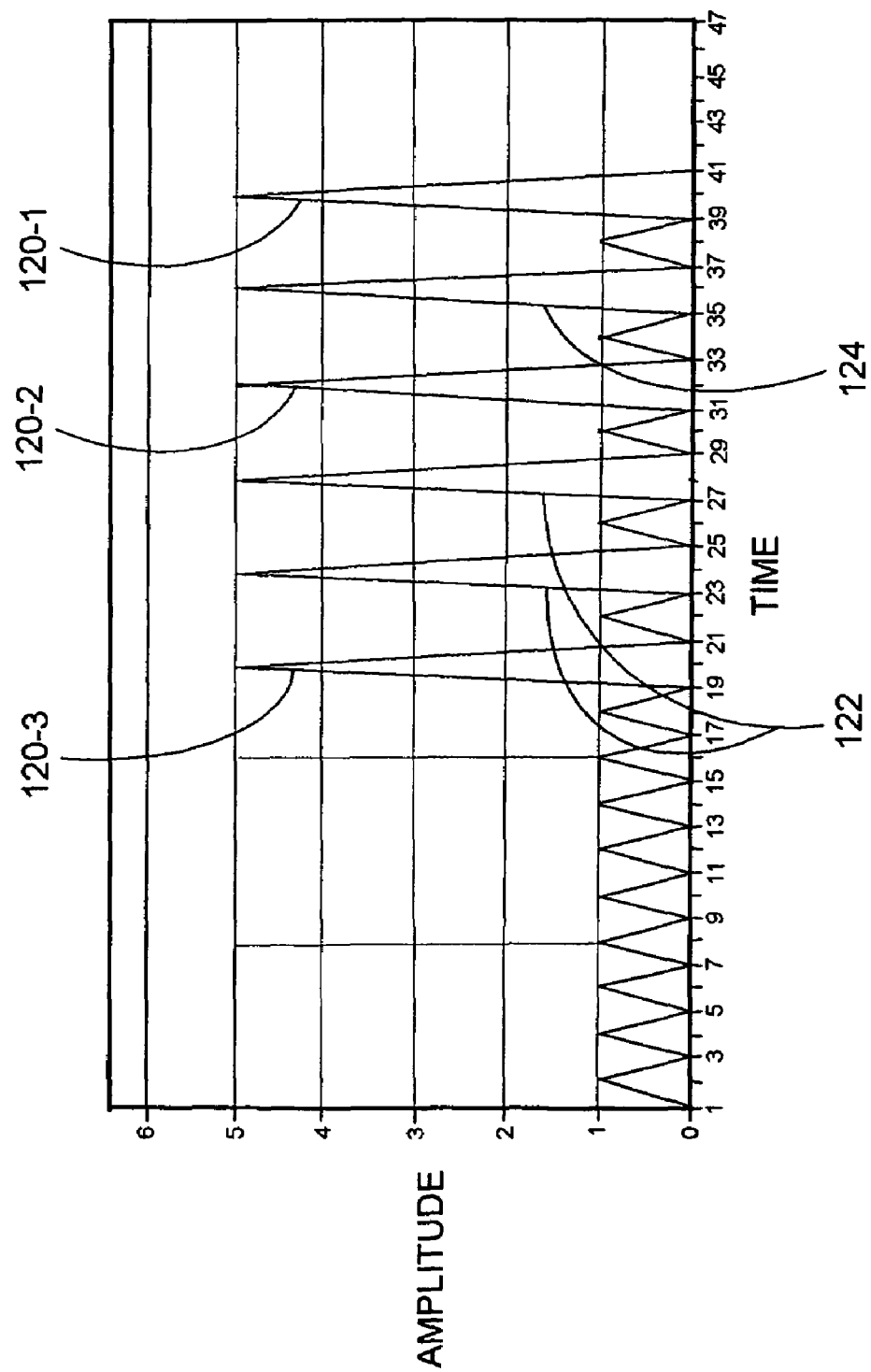

METHOD AND SYSTEM FOR PROTECTING AGAINST SIDE CHANNEL ATTACKS WHEN PERFORMING CRYPTOGRAPHIC OPERATIONS

BACKGROUND OF THE INVENTION

The subject invention relates to securing cryptographic systems against external attacks. More particularly it relates to reducing the amount of information which can be discovered by external monitoring of a system performing cryptographic operations (e.g. monitoring of external electromagnetic fields or power consumption for such a system). Hereinafter such external attacks are sometimes referred to as "side channel" attacks.

Cryptographic systems perform operations such as encryption, decryption, and generation of digital signatures by operating on messages, or information derived from the messages with keys which, in general, must be maintained as secret. Such keys (hereinafter sometimes "secret keys") can be a symmetric keys such as those used with known encryption protocols such as DES, or the private key of an asymmetric key pair such as those used with known public key encryption protocols such as RSA. As used herein secret keys also include temporary, or ephemeral, keys that are derived from secret information, used for a limited period and replaced with a new key derived from the same information. Such ephemeral keys are used in known digital signature protocols such as ECDSA. It has been shown that knowledge of an ephemeral key, publicly known parameters, and the public key is sufficient to compromise the secret information used with protocols such as ECDSA.

A fundamental process common to all such cryptographic systems is the process of a one-way function. Generally, a one-way function f is a function such that, given y and f, it is infeasible to find x such that $f(x)=y$. A process used in a number of the cryptographic systems as a one-way function is that of iteratively generating a value H by setting H=G. (where G is a digital value, and is taken as an element, hereinafter sometimes "point," of a set) then repeating the calculation H=H[op]G d−1 times, where d is an integer utilized as a secret key. Where the binary operation [op] is addition this process is called scalar multiplication. Where the binary operation [op] is multiplication this process is called exponentiation. As used hereinafter the terms "addition", "multiplication", and "exponentiation" correspond to the signs "+", "−", and "^", respectively.

Various cryptographic systems such as those described above and, in particular uses of such one way functions in such systems, are well known and need not be described further here; except to note that naive methods using d−1 successive additions or multiplications generally are too slow, and that various more efficient methods have been developed. A particularly efficient type of method is the fixed window type.

FIG. 1 illustrates the prior art computation of a scalar multiplication d·G using the fixed window method. A similar process exists for modular exponentiation. Initially, at step 10, parameters W, a window width, and d, an integer value used as a secret key, are determined and G, a digital value from a defined set over which the binary operation [op] is defined, is input. Then, at step 12, d is expressed as a sequence of k windows (i.e., binary integers W bits in length) $d_i$ such that $d_{k-1}d_{k-2}\ldots d_0$ expresses d in base $2^W$.

Then at steps 14 through 20, values $G_i$ are precomputed. At step 14 i is set equal to 0. At step 16 value $G_i$ is set equal to $2^{iW}G$, and i is incremented by 1. At step 20, if i<k, the method returns to step 16; otherwise the precomputation ends. It will be apparent to those skilled in the art that steps 10 through 20 need only be performed once and that the results can be stored for use in later operations.

After precomputation of values $G_i$, actual computation of d·G begins at step 22; where values A and B are set equal to an identity element in the set, usually denoted by 0 when the underlying binary operation is addition; or 1 when the binary operation is multiplication ; and in the generic case by I, and index j is set equal to $2^W-1$. The identity element I has a special property in the set from which G is a member in that regardless of the selected value G from the set G[op]I=I[op]G=G. Then at step 24 index i is set equal to 0 (beginning the $j^{th}$ round of computation), and at step 28 the method determines if window $d_i$ is equal to j. If so it goes to step 30 and sets B equal to B+$G_i$, and then, at step 32 increments index i by 1. Otherwise, if window $d_i$ is not equal to j the method goes directly to step 32.

After step 32, at step 36, the method determines if index i is equal to k. If not it returns to step 28 and again determines if window $d_i$ is equal to j. Otherwise, at steps 38 and 40, the method sets value A=A+B and decrements index j by 1.

Then at step 44 the method determines if index j is greater than 0. If so, it returns to step 24, resets index i to 0 (and begins the $(j-1)^{th}$ round of computation). Otherwise, at step 46 the method returns value A, equal to d·G, and ends. The value A can be used as a public key or used as part of a digital signature for cryptographic operations.

FIG. 2 shows hypothetical values which illustrate, in simplified form, a typical externally detectable signal (e.g. power variation, or external electromagnetic field) generated by a cryptographic system in calculating 98·G, with W=2; with time and amplitude expressed in arbitrary units. Hereinafter numbers in the form $nnnn_{bm}$ are to be understood as being expressed in base m; numbers without subscript are to be understood as decimal numbers.

Decimal 98=$0100010_{b2}$; and width W=2 gives windows:

$d_3=01|d_2=10|d_1=00|d_0=10$, or $1202_{b4}$. Examination of FIG. 2 shows that these values can readily be recovered by a side channel attack. From time 1 through time 6 initialization takes place steps 10 through 20 of FIG. 1). Little useful information is generated in the externally detectable signal during this period. Beginning at time 6 rounds j=3, j=2, and j=1 are computed in that sequence. Each round is delimited by peaks 50-3, 50-2, and 50-1 which occur substantially as the method loops through step 38, setting A=A+B at the end of each round. (It should be noted that peaks 50-3, 50-2, and 50-1 are shown as having a different amplitude from other peaks in FIG. 2, but, even if this were not so, these peaks can readily be identified by the regularity of their timing.) From inspection of the method of FIG. 1 it is readily seen that the decision, at step 28, whether or not to execute step 30, setting B=B+$G_i$, and generating an externally detectable peak, occurs at substantially the same time within each round. From this FIG. 2 immediately shows:

for j=3 no peaks indicates that no $d_i$=3, implying d=$????_{b4}$;
for j=2 peaks 52-2 and 52-0 indicate that $d_2=d_0$=2, implying d=$?2?2_{b4}$;
for j=1 peak 52-3 indicates that $d_3$=1, implying d=$12?2_{b4}$;
by elimination $d_1$=0, implying d=$1202_{b4}$=decimal 98;

thus showing that a side channel attack can readily yield the value used as the secret (or ephemeral) key d, i.e., decimal 98.

One approach to protecting cryptographic systems from side channel attacks is to physically shield the system so that external signals are more difficult to detect. Shielding however is not always feasible either because of the cost or because of physical limitations inherent in the system application. (e.g. Smart cards, which are mass market products intended to be carried by the user and so must be both low cost and small.) Further, continuing advances in signal processing techniques make it possible to recover information from signals with ever lower signal to noise ratios; making the protection offered by physical shielding increasingly uncertain over time. Another approach is to design computational methods that reduce the information contained in externally detectable signals. Techniques for doing this are described, for example, in U.S. Pat. 6,298,442 issued to Kocher et al. for Secure Modular Exponentiation with Leak Minimization for Smartcards and Other Cryptosystems, which describes various techniques used in methods which are resistant to side channel attacks.

While techniques such as those described in the above '442 patent are believed generally useful they are not believed to provide maximal protection for fixed window methods, as will be described below. Thus it is an object of the subject invention to provide a method and system for implementing a fixed window method for iteratively generating a value [op] dG; the method having increased resistance to side channel attacks.

BRIEF SUMMARY OF THE INVENTION

The above object is achieved and the disadvantages of the prior art are overcome in accordance with the subject invention by a method and system operating in accordance with the method to process a message using a cryptographic protocol involving an integer value d used as a secret or ephemeral key, the protocol including computing a result of iteratively performing a binary operation [op] on a digital quantity G. In accordance with the subject invention the result is computed by expressing the key d in base $2^W$ as $d_{k-1}d_{k-2} \ldots d_0$; determining values $G_i$, for $0 \leq i \leq k-1$, such that $G_i=[op]^{2^{iW}} G$; establishing a table of registers pos[j], $1 \leq j \leq 2^W-1$, such that, for each of the values of j, register pos[j] stores the values of i such that $d_i=j$; setting a value A=I, where I is the identity element in a set including said quantity G for the operation [op], setting a value $j=2^W-1$; and then for all of said values i stored in pos[j], updating said value $B=B[op]G_i$; updating A=A[op]B; setting said value j=j −1; and if said value j>0 returning to update said value B, and otherwise, returning the value $A=[op]^d G$, where the value A can be used as a public or ephemeral key in elliptic curve cryptography or the value A can be used as a digital signature in other cryptographic systems.

In accordance with one aspect of the subject invention the binary operation [op] is addition.

In accordance with another aspect of the subject invention the binary operation [op] is multiplication modulo N, where N is an integer.

In accordance with another aspect of the subject invention the secret key d is an asymmetric key and the message is encrypted or decrypted or digitally signed.

In accordance with another aspect of the subject invention the secret key d is an ephemeral key and the message is digitally signed.

Other objects and advantages of the subject invention will be apparent to those skilled in the art from consideration of the detailed description set forth below and the attached drawings.

BRIEF DESCRIPTION OF THE DRAWINGS

FIG. 5 illustrates a hypothetical external signal generated in executing a computation in accordance with the method of FIGS. 4a and 4b.

DETAILED DESCRIPTION OF PREFERRED EMBODIMENTS OF THE INVENTION

Figure 3:
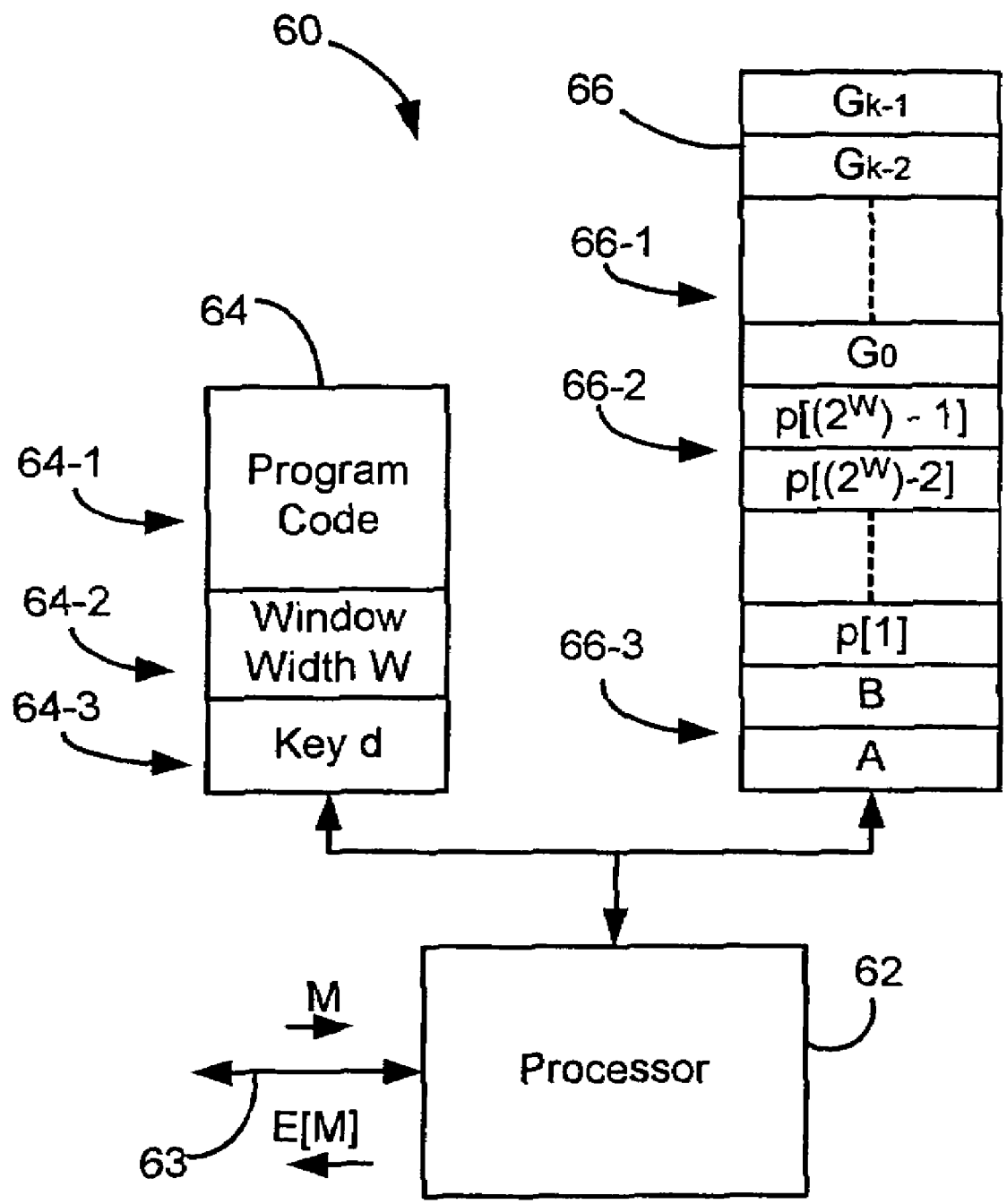
FIG. 3 shows a block diagram of a cryptographic system in accordance with the subject invention.

FIG. 3 shows cryptographic system 60 that is resistant to such side channel attacks. System 60 includes processor 62 having input/output channel 63 for input of message M and output of cryptographically processed message E [M]. Processor 62 communicates with memory 64 which stores program code for controlling processor 62 to implement a cryptographic protocol such as RSA, or ECDSA in locations 64-1, window width W in location(s) 64-2 and secret key d, which is an integer value in location(s) 64-3. Such cryptographic protocols are well known and need not be described further here for an understanding of the subject invention; except to note that these and other similar protocols implement processes where a binary operation [op] is iteratively applied to a value G. Code and values stored in memory 64 can of course be updated for various different applications in any convenient manner. Processor 62 also communicates with working memory 66 which stores values $G_i$, $0 \leq i \leq k-1$, where k is the number of digits required to express key d base W, in locations 66-1; registers pos[j], where $1 \leq j \leq 2^W-1$, in locations 66-2; and accumulation registers (hereinafter sometimes "accumulators") A and B, in locations 66-3.

Figure 4A:
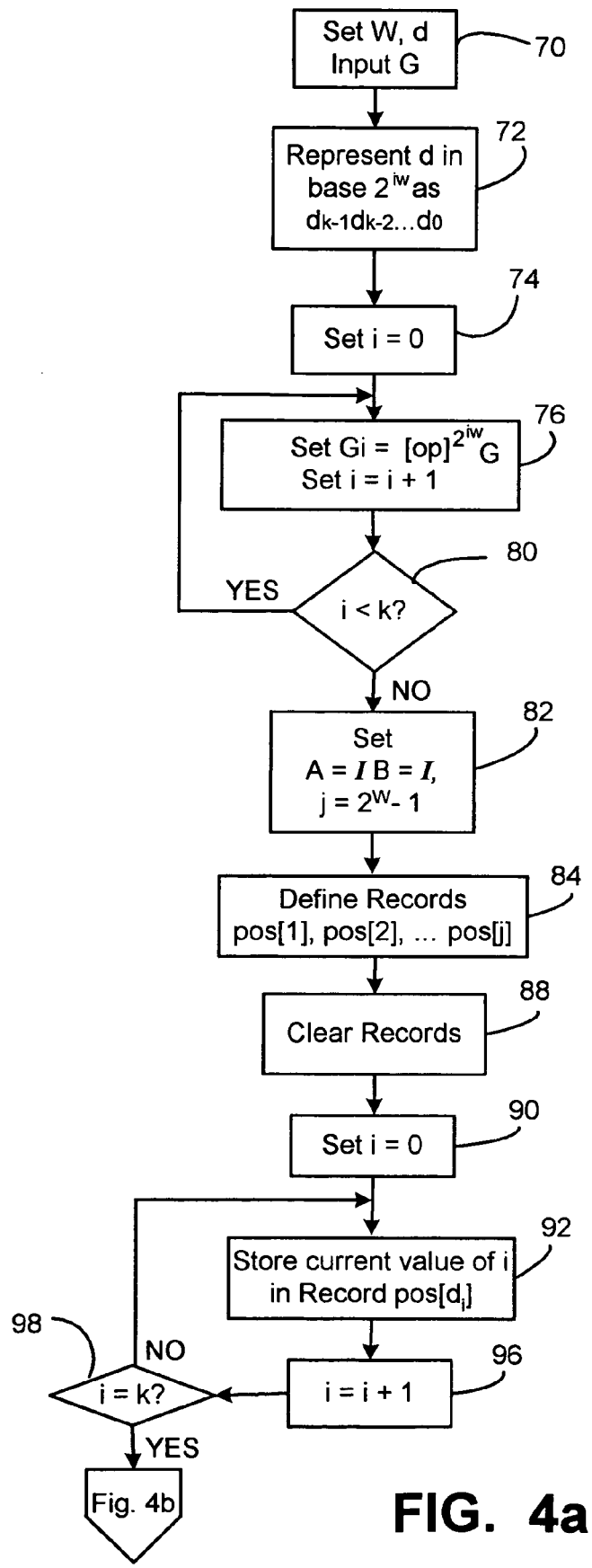
FIGS. 4a and 4b show a flow diagram of an method for controlling the system of FIG. 3 to compute the iterative application of a binary operation [op] to a value G in accordance with the subject invention.
Figure 4B:
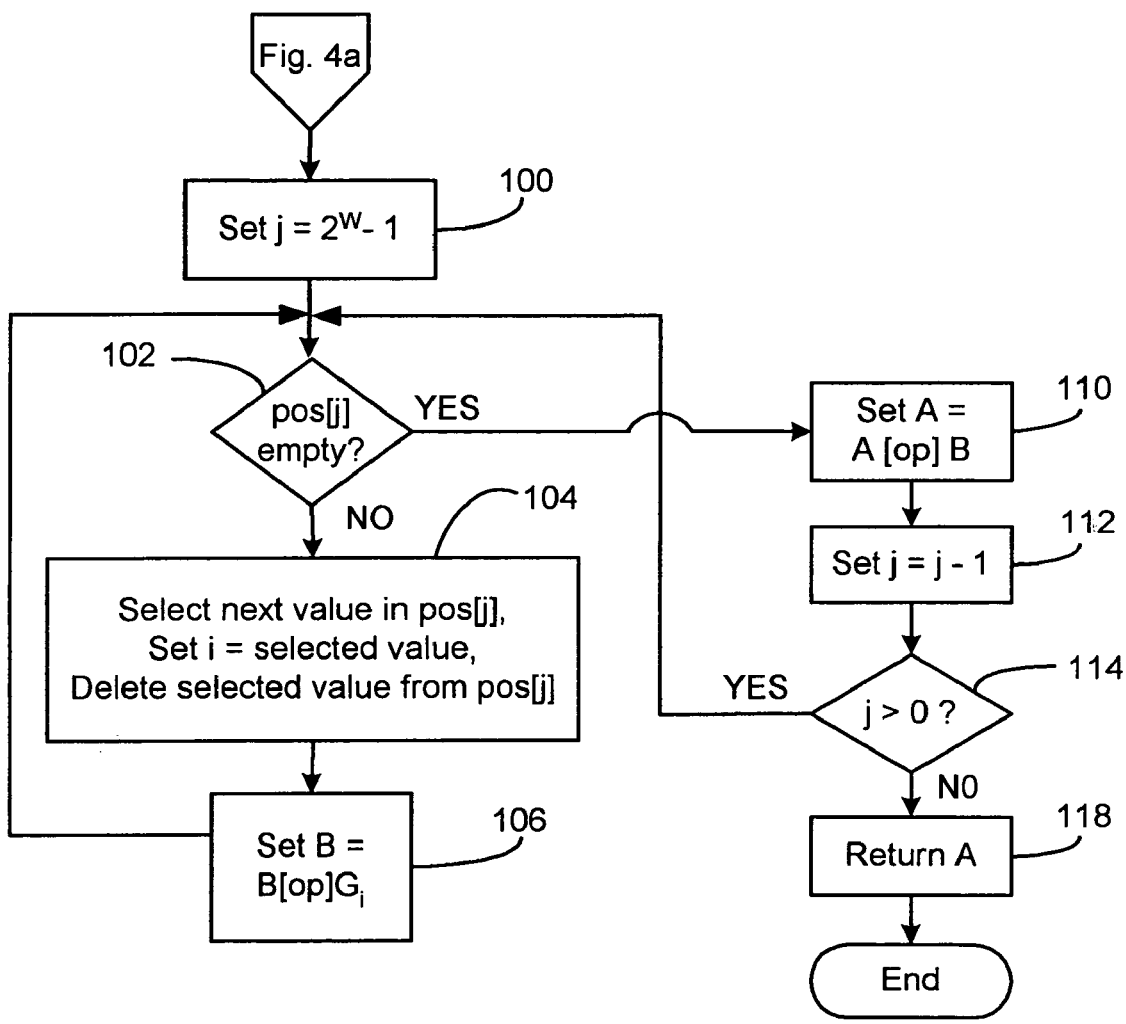

FIGS. 4a and 4b show a flow diagram of the system 60 in executing a method in accordance with the subject invention for computing $[op]^d G$ in a cryptographic protocol. Where the binary operation [op] is addition "+" the result is the multiplication "d·G". Where "[op]" is multiplication "−" the result is the exponentiation "$G^d$".

Figure 1:
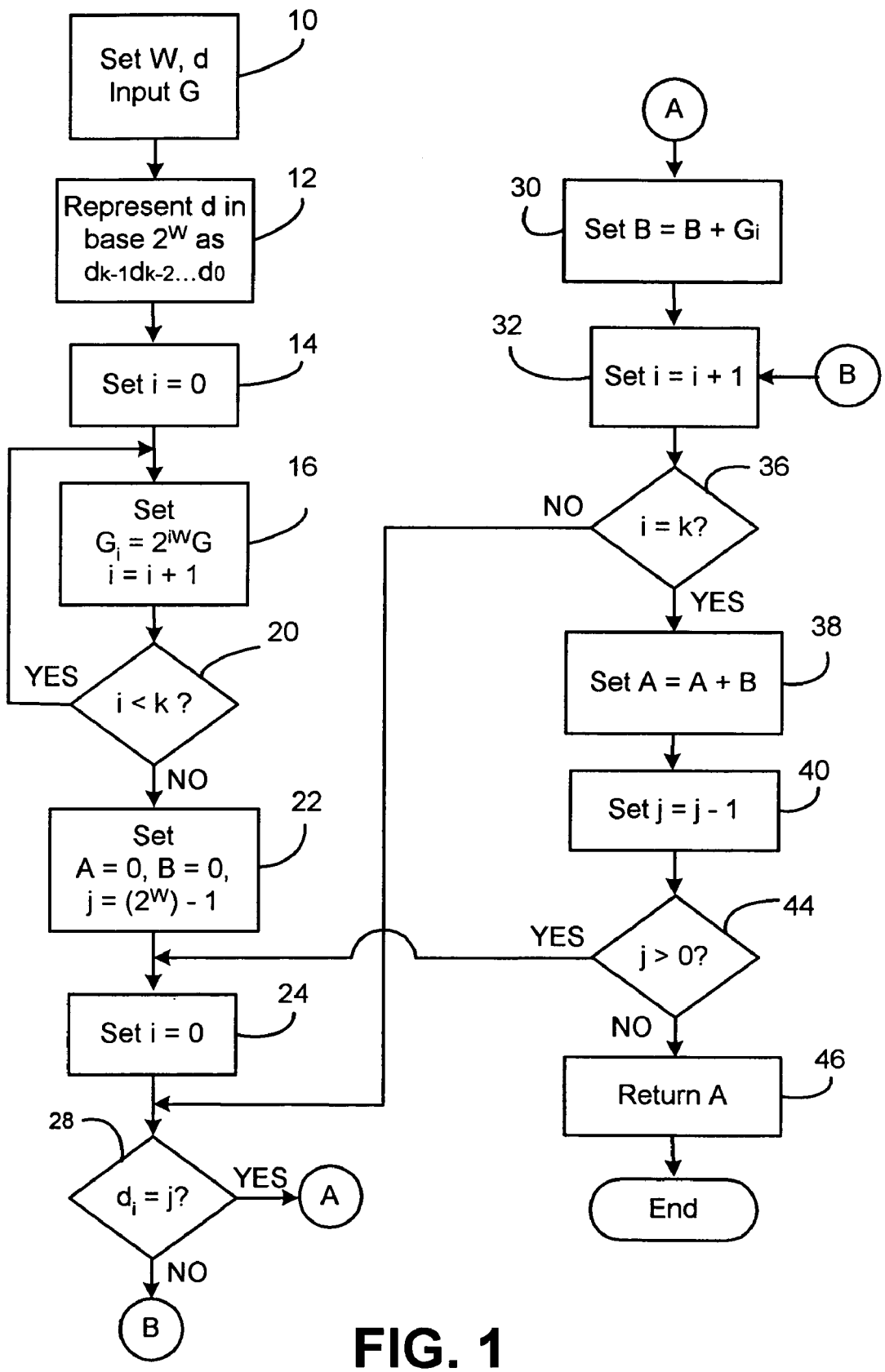
FIG. 1 shows a flow diagram of a prior art method for computing d·G mod N.

In substantially the same manner as described above with respect to FIG. 1, at step 70, parameters W, a window width and d, a secret key, taken as a binary integer, are determined; and G, a binary integer derived from message M on which the cryptographic system operates, is input. Then, at step 72, d is expressed as a sequence of windows (i.e. binary integers W bits in length) $d_i$ such that $d_{k-1}d_{k-2} \ldots d_0$ expresses d in base $2^W$.

Then at steps 74 through 80, values $G_i$ are precomputed. At step 74 i is set equal to 0. At step 76 value $G_i$ is set equal to $[op]^{1^{iW}} G$ (e.g. if the operation is addition: $G_i=2^{iW}·G$, and if it is multiplication $G_i=G^{2^{iW}}$, and i is incremented by 1. At step 80, if i<k, the processor 62 returns to step 76; otherwise the precomputation ends. As with the method of FIG. 1, steps 70 through 80 need only be performed once and the results can be stored for use in later operations.

At step 82 accumulators A and B are set equal to I where I is the identity element for the binary operation [op]: 0 for addition, 1 for multiplication; and j is set=$2^W-1$. At step 84 registers pos[j], $0 \leq j \leq 2^W-1$, are defined in working memory locations 66-2, and then cleared at step 88.

At step 90 i is set=1 and at step 92 the current value of i is stored in register pos[$d_i$]. At step 96 i is set=i+1 and at step 98, if i≠k, processor 62 returns to step 92. Thus a table is defined such that, for all j>0, pos[j] contains all those, and only those, values of i such that $d_i$=j.

If i=k in step 98, then at step 100 (shown in FIG. 4b) j is set=$2^W-1$. Then at step 102 processor 62 determines if register pos[j] is empty. If not, at step 104, processor 62 determines the next value stored in pos[j], sets i=to the selected value, and deletes the selected value from pos[j]. Then at step 106 processor 62 sets B=B[op]$G_i$.

If at step 102 register pos[j] is determined to be empty, then at step 110 processor 62 sets accumulator A=A[op]B, at step 112 sets j=j−1, and at step 114 determines if j>0, and, if so returns to step 102. Otherwise, at step 118 processor 62 returns A. As noted above, if [op] is addition A=d·G, and if it is multiplication A=$G^d$.

Again taking d=98=$1202_{b4}$ as an example, examination of FIG. 5 shows the increased difficulty in recovering these values by a side channel attack. From time 1 through time 8 initialization takes place during steps 70 through 80. Again, little useful information is generated in the externally detectable signal during this period. From time 8 through time 16 the table of registers pos[j] is generated, also generating little useful information. Beginning at time 16 registers pos[3], registers pos[2], and registers pos[1] are processed in that sequence at steps 102, 104, and 106 (shown in FIG. 4b). Each round of processing is delimited by peaks 120-3, 120-2, and 120-1 which occur substantially as the method loops through step 110, setting A=A [op]B. From inspection of the method of FIGS. 4a and 4b it is readily seen that the peaks generated at step 106, setting B=B[op]$G_i$, do not have any timing dependencies indicating the value of i when they occurred. From this FIG. 5 immediately shows:

for pos[3] no peaks indicates that no $d_i$=3;
for pos[2] peaks 122 indicate that $d_i$=2 for two values of i, without any indication of which particular values they are;
for pos[1] peak 124 indicates that $d_i$=1 for one (unknown) value of i; and
by elimination di=0 for one (unknown) value of i;

showing only that secret key d is equal to one of twelve possible combinations of two "2's"; one "1"; and one "0". While twelve possibilities of course will not present an attacker with a significant obstacle, the number of possible combinations grows rapidly with k (number of windows) and, with typical secret keys being hundreds of bits in length, it is believed that a practical cryptographic system in accordance with the subject invention will present substantial obstacles to a side channel attack.

While it is possible that the method of the subject invention may be susceptible to side channel attacks in rare cases where windows $d_i$ take on only a few values, it should be noted that it can be shown that the method of the subject invention will always provide at least as much resistance to side channel attacks as the above described prior art method.

In a preferred embodiment of the subject invention the binary operation [op] is modular addition. In another preferred embodiment of the subject invention the binary operation [op] is multiplication modulo N. In another preferred embodiment of the subject invention the binary operation [op] is addition of elliptic curve points.

Figure 6:
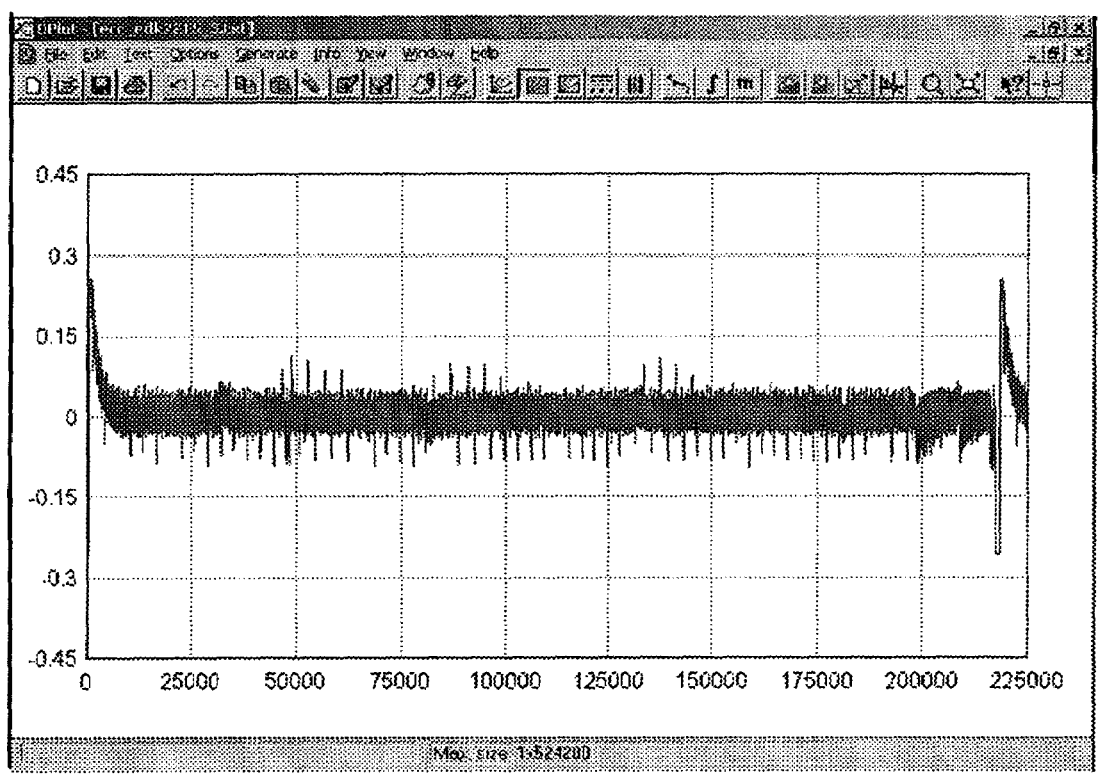
FIG. 6 shows an oscilloscope trace of an external signal generated in executing a computation in substantially in accordance with the method of FIG. 1.
Figure 7:
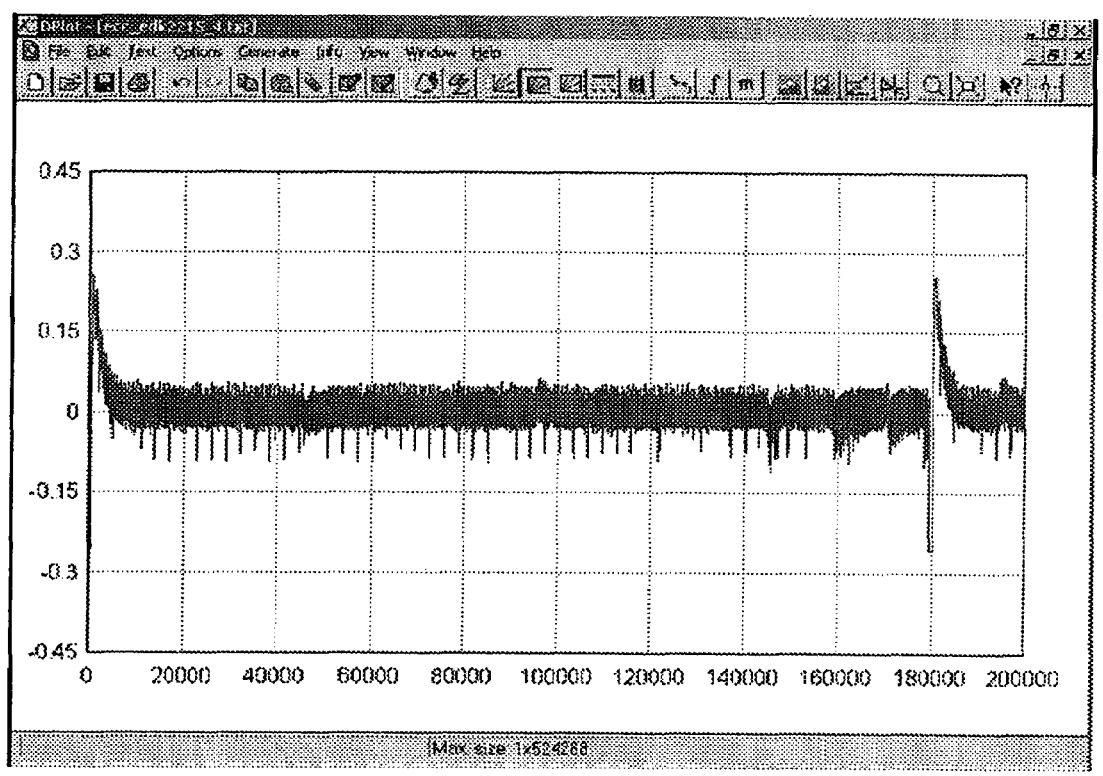
FIG. 7 shows an oscilloscope trace of an external signal generated in executing a computation in substantially in accordance with the method of FIGS. 4a and 4b.

FIGS. 6 and 7 show oscilloscope traces of external signals generated by a 32 bit microprocessor performing multiplication, i.e., where the binary operation is addition. In FIG. 6 the processor operates in accordance with the prior art and executes the following code:

```
for(j=15;j>0;j--) {
    for(i=0;i<n;i++) {
        if(((OP->d[i/8]&NIB_MASK[i%8]) >> (4 * (i%8))) ==j) {
            point_add(B, B, baseP[i], T);
        }
    }
    point_add(A, A, B, T);
}
```

In FIG. 7 the processor operates substantially in accordance with the subject invention and executes the following code:

```
for (j = 0; j < 16; j++) {
    index[j] = 0;
}
for (k = 0; k < n; k++) {
    nib = ((OP->d[k/8]&NIB_MASK[k%8]) >> (4 * (k%8)));
    pos [nib] [index[nib] ++] = k;
}
for (j = 15; j>0; j--) {
    for (i = 0; i < index[j]; i++) {
        point_add(B, B, baseP[pos[j] [i]], T);
    }
    point_add(A, A, B, T);
}
```

In both Figures the key (i.e. integer d) used was:

11111111111111115555555599559999 1FFFFF FFFFFFFFFFFF

Figure 2:
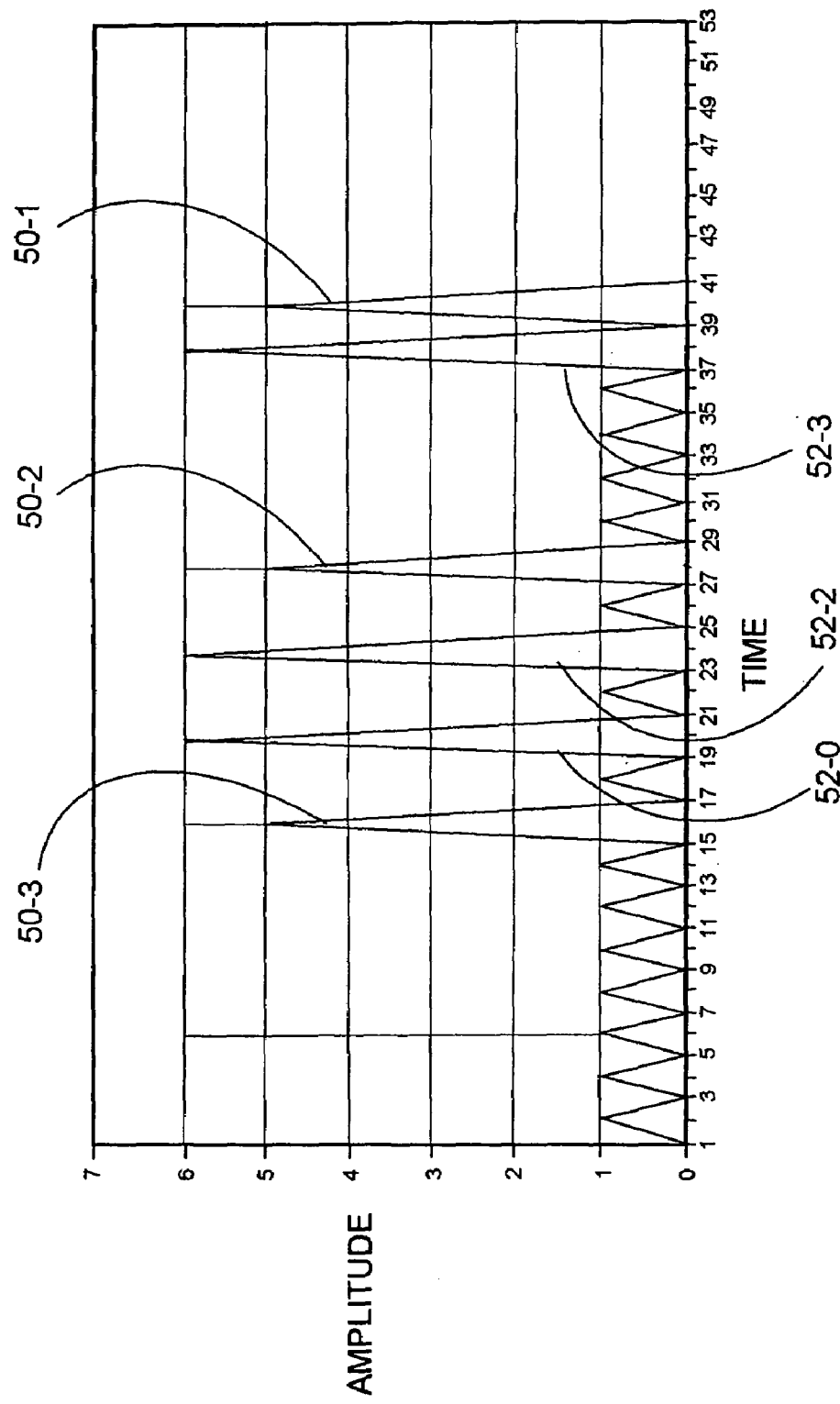
FIG. 2 illustrates a hypothetical external signal generated in executing a computation in accordance with the method of FIG. 1.

It will immediately be apparent to those skilled in the art that substantially less information about the value of the key can be determined from the external signal shown in FIG. 7 then from that shown in FIG. 6. In FIG. 6 the number of digits having each value is readily found while in FIG. 7 only the number of non-zero digits could be identified. Note that in both cases this is less than the information found in the corresponding hypothetical examples illustrated in FIGS. 2 and 5. It is believed that this is because the hypothetical examples were created assuming little or no shielding or other practical difficulties. It is also believed that, with further analysis the exact vale of the key can be determined from FIG. 6.

The embodiments described above and illustrated in the attached drawings have been given by way of example and illustration only. From the teachings of the present application those skilled in the art will readily recognize numerous other embodiments in accordance with the subject invention. Accordingly, limitations on the subject invention are to be found only in the claims set forth below.

What is claimed is:

1. A method for cryptographically securing a message using a secret key d to iteratively perform a binary group operation of addition or multiplication [op] on a digital quantity G, said method comprising:

expressing d in base $2^W$ as $d_{k-1}d_{k-2} \ldots d_0$, where W is a window width and k is a number of windows required to express d;

determining values $G_i$, for $0 \leq i \leq k-1$, where $G_i = [op]^{2^{iW}} G$;

for values j where $1 \leq j \leq 2^W - 1$, establishing a table of register positions [j] where, for each of said values of j, register position [j] stores each of said values of i where $d_i = j$;

setting values A=I, and B=I, where I is the identity element in a set including said quantity G for the binary group operation [op];

setting a value $j = 2^W - 1$; and then for all of said values i stored in register positions [j], updating said value $B = B[op]G_i$;

updating $A = A[op]B$;

setting said value $j = j-1$; and if said value $j > 0$ returning to update said value $B = B[op]G_i$; and otherwise returning said value A, where said value $A = [op]^d G$, for use as a cryptographic key; and using said cryptographic key to cryptographically secure said message.

2. A method as described in claim 1 where the binary group operation is addition of elliptic curve points.

3. A method as described in claim 1 where said binary group operation [op] is multiplication modulo N, where N is an integer.

4. A method as described in claim 1, wherein said digital quantity G is derived from a message M.

5. A method as described in claim 1, wherein said digital quantity G is a fixed value.

6. A cryptographic system for decrypting an encrypted message M using a key, d, by iteratively performing a binary group operation [op] on a digital quantity G to produce a decrypted message D(M), said quantity G being derived from said encrypted message M, said system comprising:

a plurality of first storage locations storing program code;

one or more second storage locations storing a window width W;

one or more third storage locations storing a value for said key, d;

a plurality of first working storage locations for storing a corresponding plurality of values $G_i$;

a plurality of second working storage locations for storing a corresponding plurality of registers positions [j];

a plurality of accumulators for storing variable values A and B; and a processor communicating with said storage locations and said working storage locations, said processor having an input/output channel for input of said encrypted message M and output of said decrypted message D(M), said processor executing said program code to decrypt said message M by:

expressing said key d in base $2^W$ as $d_0 d_1 \ldots d_{k-1}$;

determining said values $G_i$, for $0 \leq i \leq k-1$, such that $G^i = [op]^{2^{iW}} G$ and storing said determined values of Gi in said first working storage locations;

for values j such that $1 \leq j \leq 2^W - 1$, establishing a table of said register positions [j] such that for each value of j, register position [j] stores values of i such that $d_i = j$;

setting said values A=I, and B=I, where I is an identity element for said binary operation [op];

setting a value $j = 2^W - 1$;

determining if register position [j] is empty;

if register position [j] is not empty, selecting a next of said values of i stored in said register position [j], deleting said next value of i from said register position [j] setting said value $B = $ said value $B[op]G_i$, where i=said next value, and repeating until register position [j] is empty;

setting said value $A = A[op]B$;

setting said index $j = j-1$; and if said index $j > 0$, returning to determine if register position [j] is empty;

otherwise returning said value A; where said value $A = [op]^d G$; and outputting as said decrypted message D(M) said returned value A.

7. A system as described in claim 6 where said value d is an asymmetric key.

8. A system as described in claim 6 where said binary group operation [op] is multiplication module N, where N is an integer.

9. A system as described in claim 8 where said value d is an asymmetric key.

10. A cryptographic system for generating a public key of a public/private key pair, the public key being derived from a private key, d, taken as an integer value, of the key pair by iteratively performing a binary group operation [op] on a digital representation of a group element G, said system comprising:

a plurality of first storage locations storing program code;

one or more second storage locations storing a window width W;

one or more third storage locations storing the private key d;

a plurality of first working storage locations for storing a corresponding plurality of values $G_i$ a plurality of second working storage locations for storing a corresponding plurality of registers positions [j];

a plurality of accumulators for storing variable values A and B; and a processor communicating with said storage locations and said working storage locations, said processor having an input/output channel for input of said private key and output of said public key, said processor executing said program code to generate said public key by:

determining a series of k digital values di, where index i has values ranging from 0 to k-1, where said series represents said private key in base $2^W$;

determining k digital values $G_i$, such that $G_i = [op]^{2^{iW}} G$;

setting said variable value A and said variable value B equal to an identity element for said binary operation;

for values j such that $1 \leq j \leq 2^W - 1$, establishing a table of register positions [j] such that, for each of said values of j, register position [j] stores each of said values of i such that $d_i = j$;

set said index $j = 2^W - 1$;

determining if register position [j] is empty;

if register position [j] is not empty, selecting a next of said values of i stored in said register position [j], deleting said next value of i from said register position [j], setting said value $B = $ said value $B[op]G_i$, where i=said next value, and repeating until register position [j] is empty;

setting said value $A = A[op]B$;

setting said index $j = j-1$; and if said index $j \geq 0$, returning to determine if register position [j] is empty;

otherwise returning said public key as said value A, where said value $A = [op]^d G$.

11. A system as described in claim 10, wherein said key pair is an ephemeral key pair.

12. A cryptographic system for creating a digital signature for a message M using a key, d, by iteratively performing a binary group operation [op] on a digital quantity G to produce said digital signature sig(M), said quantity G being derived from said message M, said system comprising:
- a plurality of first storage locations storing program code;
- one or more second storage locations storing a window width W;
- one or more third storage locations storing a value for said key, d;
- a plurality of first working storage locations for storing a corresponding plurality of values $G_i$;
- a plurality of second working storage locations for storing a corresponding plurality of register positions [j];
- a plurality of accumulators for storing variable values A and B; and
- a processor communicating with said storage locations and said working storage locations, said processor having an input/output channel for input of said message M and output of said digital signature sig(M), said processor executing said program code to create said digital signature by:
  - expressing said key d in base $2^W$ as $d_0 d_1 \ldots d_{k-1}$;
  - determining said values $G_i$, for $0 \leq i \leq k-1$, such that $G^i = [op]^{2^{iW}} G$ and storing said determined values of $G_i$ in said first working storage locations;
  - for values j such that $1 \leq j \leq 2^W - 1$, establishing a table of said register positions [j] such that for each value of j, register position [j] stores values of i such that $d_i = j$;
  - setting said values A=I, and B=I, where I is an identity element for said binary operation [op];
  - setting a value $j = 2^W - 1$; and then
    - for all of said values i stored in register position [j], updating said value $B = B[op]G_i$;
    - updating said value $A = A[op]B$
    - setting said value $j = j - 1$; and
    - if said value $j > 0$ returning to update said value $= B[op]G_i$; otherwise
  - returning said value A; where said value $A = [op]^d G$; and
  - outputting as said digital signature sig(M) said returned value A.

13. A system as described in claim 12 where said value d is an asymmetric key.

14. A system as described in claim 12 where said binary group operation [op] is multiplication module N, where N is an integer.

15. A system as described in claim 14 where said value d is an asymmetric key.

* * * * *